US011163172B2

United States Patent
Park et al.

(10) Patent No.: US 11,163,172 B2
(45) Date of Patent: Nov. 2, 2021

(54) OPTICAL ISOLATION DEVICE

(71) Applicant: LG Chem, Ltd., Seoul (KR)

(72) Inventors: Seong Min Park, Daejeon (KR); Sang Choll Han, Daejeon (KR); Jae Jin Kim, Daejeon (KR)

(73) Assignee: LG Chem, Ltd.

( * ) Notice: Subject to any disclaimer, the term of this patent is extended or adjusted under 35 U.S.C. 154(b) by 414 days.

(21) Appl. No.: 16/340,535

(22) PCT Filed: Oct. 13, 2017

(86) PCT No.: PCT/KR2017/011317
§ 371 (c)(1),
(2) Date: Apr. 9, 2019

(87) PCT Pub. No.: WO2018/070830
PCT Pub. Date: Apr. 19, 2018

(65) Prior Publication Data
US 2020/0050028 A1 Feb. 13, 2020

(30) Foreign Application Priority Data
Oct. 13, 2016 (KR) ......................... 10-2016-0132843

(51) Int. Cl.
*G02B 27/28* (2006.01)
*G02B 5/32* (2006.01)
(Continued)

(52) U.S. Cl.
CPC .......... *G02B 27/28* (2013.01); *G02B 5/3083* (2013.01); *G02B 5/32* (2013.01); *G02B 27/286* (2013.01);
(Continued)

(58) Field of Classification Search
CPC ........ G02B 27/28; G02B 5/3083; G02B 5/32; G02B 27/286; G02F 1/133528; G02F 1/13362; G02F 1/133548; G02F 1/093
See application file for complete search history.

(56) References Cited

U.S. PATENT DOCUMENTS

2004/0101237 A1    5/2004  Cao
2012/0092735 A1*   4/2012  Futterer ............. G03H 1/08
                                                         359/11

FOREIGN PATENT DOCUMENTS

EP    1498770 A1    1/2005
JP    S6353514 A    3/1988
(Continued)

OTHER PUBLICATIONS

Search report from International Application No. PCT/KR2017/011317, dated Jan. 19, 2018.
(Continued)

*Primary Examiner* — Nathanael R Briggs
(74) *Attorney, Agent, or Firm* — Lerner, David, Littenberg, Krumholz & Mentlik, LLP

(57) ABSTRACT

The present application relates to an optical isolation device. The present application provides an optical isolation device having a high transmittance in a forward direction and an excellent isolation ratio. Such an optical isolation device can be applied to various applications such as the field of optical communication or laser optics, the field of security or privacy protection, brightness enhancement of displays, or a use for hiding and covering.

9 Claims, 1 Drawing Sheet

(51) Int. Cl.
*G02F 1/1335*   (2006.01)
*G02F 1/13357*  (2006.01)
*G02B 5/30*     (2006.01)
*G02F 1/09*     (2006.01)

(52) U.S. Cl.
CPC .... *G02F 1/13362* (2013.01); *G02F 1/133528* (2013.01); *G02F 1/093* (2013.01); *G02F 1/133548* (2021.01)

(56) References Cited

FOREIGN PATENT DOCUMENTS

| | | |
|---|---|---|
| JP | S63228426 A | 9/1988 |
| JP | H5232320 A | 9/1993 |
| JP | H9222512 A | 8/1997 |
| JP | 2004347784 A | 12/2004 |
| JP | 2007225905 A | 9/2007 |
| JP | 2007322832 A | 12/2007 |
| JP | 2008090052 A | 4/2008 |
| JP | 2010224520 A | 10/2010 |
| JP | 2014010241 A | 1/2014 |
| JP | 2016138966 A | 8/2016 |

OTHER PUBLICATIONS

Extended European Search Report including Written Opinion for Application No. EP17860296.7, dated Oct. 4, 2019, pp. 1-7.

Fang, et al., Intelligent Photonic Switch Based on Polarization-Selective Birefringent Computer-Generated Holograms, Optics Letters, Feb. 1995, pp. 336-338, vol. 20, No. 3, Optical Society of America.

* cited by examiner

[Figure 1]
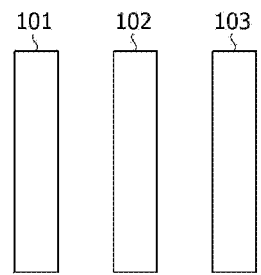
[Figure 2]
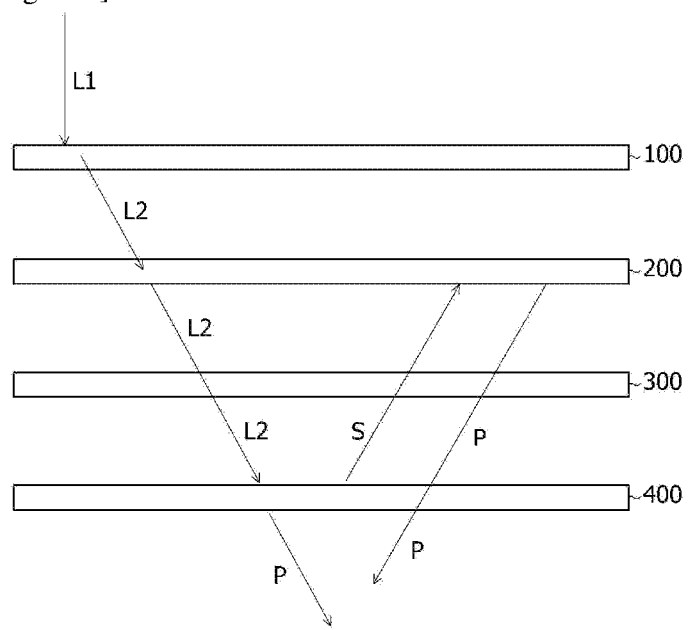
[Figure 3]
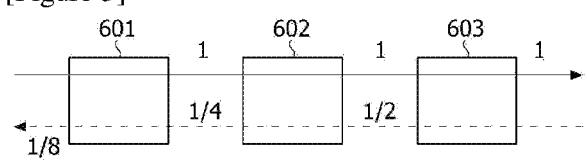

OPTICAL ISOLATION DEVICE

CROSS-REFERENCE TO RELATED APPLICATIONS

The present application is a national phase entry under 35 U.S.C. § 371 of International Application No. PCT/KR2017/011317 filed on Oct. 13, 2017, which claims priority from Korean Patent Application No. 10-2016-0132843 filed on Oct. 13, 2016, all of which are incorporated herein by reference.

TECHNICAL FIELD

The present application relates to an optical isolation device.

BACKGROUND ART

The optical isolation device is a device in which light transmittance in the forward direction is higher than light transmittance in the backward direction, which is also called an optical diode. The optical isolation device can be used to prevent unnecessary reflected light in the field of optical communication or laser optics, or it can also be applied to a building or automobile glass to be used for security or privacy protection, and the like. The optical isolation device can also be applied to applications such as brightness enhancement in various displays or military products for hiding and covering.

As the optical isolation device, there is a Faraday optical isolator using Faraday effect. The principle of the Faraday optical isolator is shown in FIG. 1. The Faraday optical isolator comprises a first reflective polariscope (101), a Faraday rotator (102) and a second reflective polariscope (103), where the absorption axes of the first and second reflective polariscopes (101, 103) are disposed to form 45 degrees with each other. The Faraday rotator rotates incident light linearly polarized by passing through the first reflective polariscope by 45 degrees, whereby the incident light is transmitted through the second reflective polariscope (forward direction). On the contrary, if the linearly polarized light transmitted through the second reflective polariscope is equally rotated 45 degrees by the Faraday rotator, it becomes linearly polarized light parallel to the absorption axis of the first reflective polariscope, so that it cannot be transmitted through the first reflective polariscope (backward direction).

Since the Faraday optical isolator requires a very large external magnetic field for driving and an expensive material has to be applied thereto, it is difficult to make it large in size.

DISCLOSURE

Technical Problem

The present application relates to an optical isolation device.

Technical Solution

The term optical isolation device may mean a device configured such that the transmittance of light incident in either direction is relatively greater than the transmittance of light incident in the opposite direction. In the optical isolation device, the direction having a large transmittance of incident light can be referred to as a forward direction, and the opposite direction can be referred to as a backward direction. Here, the forward direction and the backward direction may form an angle of approximate 160 degrees to 200 degrees with each other, but is not limited thereto. In one example, the forward direction may be a direction facing from a light entrance surface of a first holographic element toward a light exit surface in an optical isolation element to be described below, and this direction may also be referred to as a first direction. In addition, the backward direction may be a direction facing from the light exit surface of the first holographic element toward the light entrance surface in an optical isolation element to be described below, and this direction may also be referred to as a second direction.

In this specification, the reference wavelength of optical properties such as the terms transmittance, retardation value, reflectance and refractive index can be determined according to light to be isolated by using the optical isolation device. For example, the reference wavelength may be the wavelength of the light to be isolated. For example, when the optical isolation device is intended to isolate light in the visible light region, the reference wavelength of the transmittance or the like may be, for example, a value based on light having any wavelength within the range of 400 nm to 700 nm or about 550 nm; in the case of being intended to isolate light in the infrared region, the transmittance or the like may be determined based on light having a wavelength of 1,000 nm; and in the case of being intended to isolate light in the ultraviolet region, the transmittance or the like may be determined based on light having a wavelength of 250 nm.

In the optical isolation device, the ratio of the transmittance of the light incident in the forward direction and the transmittance of the light incident in the backward direction can be about 3 dB or more, by the isolation ratio (IR) depending on Equation 1 below. In another example, the isolation ratio may be about 3.5 dB or more. The upper limit of the isolation ratio is not particularly limited because it shows that the higher the numerical value is, the better the optical isolation effect. In one example, the isolation ratio may be about 10 dB or less, about 9.5 dB or less, about 9 dB or less, about 8.5 dB or less, about 8 dB or less, about 7.5 dB or less, about 7 dB or less, about 6.5 dB or less, about 6 dB or less, about 5.5 dB or less, or about 5 dB or less.

$$IR=10 \times n \times \log(F/B) \quad \text{[Equation 1]}$$

In Equation 1, IR is an isolation ratio, n is a number of optical isolation elements, which are described below, included in the optical isolation device, F is a transmittance of light incident on the optical isolation device in the forward direction, and B is a transmittance of light incident on the optical isolation device in the backward direction.

The transmittance of light incident in the forward direction of the optical isolation device may be about 5% or more, about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, or about 95% or more. The upper limit of the forward transmittance may be about 100%. Also, the transmittance of light incident in the backward direction of the optical isolation device may be less than about 50%, about 45% or less, about 40% or less, about 35% or less, about 30% or less, about 25% or less, about 20% or less, about 15% or less, about 10% or less, or about 5% or less. The lower limit of the backward transmittance may be about 0%.

In addition, the light transmitted through the optical isolation device in the forward direction may substantially comprise only any one polarized light among an orthogonal mode pair of polarized lights to be described below. For example, 90% or more, or 95% or more of the light transmitted through the optical isolation device may be the one polarized light. Ideally, 100% of the light transmitted through the device may be only the one polarized light.

The optical isolation device may comprise at least one or more optical isolation elements. The term optical isolation element is a unit element forming an optical isolation device, which has an optical isolation function alone. Accordingly, the optical isolation element is also configured such that the transmittance of the light incident in the forward direction is relatively larger than the transmittance of the light incident in the backward direction, where the range of the isolation ratio, forward transmittance and backward transmittance can be applied equally by the contents mentioned in the optical isolation device.

The optical isolation element may comprise at least first and second holographic elements, a retarder, and a reflective polariscope. The holographic elements, the retarder and the reflective polariscope may have each a light entrance surface and a light exit surface. Here, each element may be included in the order of the first holographic element, the second holographic element, the retarder and the reflective polariscope. That is, the light exit surface of the first holographic element and the light entrance surface of the second holographic element, the light exit surface of the second holographic element and the light entrance surface of the retarder, and the light exit surface of the retarder and the light entrance surface of the reflective polariscope can be opposed to each other.

In the present application, the term incident angle is an angle measured based on a normal of a light entrance surface, unless otherwise specified, where the angle measured in the clockwise direction based on the normal is represented by a positive number and the angle measured in the counterclockwise direction is represented by a negative number. Furthermore, in the present application, the term output angle is an angle measured based on a normal of a light exit surface, unless otherwise specified, where the angle measured in the clockwise direction based on the normal is represented by a positive number and the angle measured in the counterclockwise direction is represented by a negative number.

Here, the first holographic element may be an element capable of exiting light incident at an incident angle, which is a first angle, to an output angle, which is a second angle. Here, the first and second angles may be different angles from each other. Here, the first angle may be an angle of greater than −90 degrees and less than 90 degrees. The first angle may be −80 degrees or more, −70 degrees or more, −60 degrees or more, −50 degrees or more, −40 degrees or more, −30 degrees or more, −20 degrees or more, −10 degrees or more, or −5 degrees or more, and the first angle may be 80 degrees or less, 70 degrees or less, 60 degrees or less, 50 degrees or less, 40 degrees or less, 30 degrees or less, 20 degrees or less, 10 degrees or less, or 5 degrees or less, and may be substantially 0 degrees.

Here, the second angle may be greater than 0 degrees and less than 90 degrees. In another example, the second angle may be 5 degrees or more, 10 degrees or more, 15 degrees or more, 20 degrees or more, or 25 degrees or more, or may be 85 degrees or less, 80 degrees or less, 75 degrees or less, 70 degrees or less, 65 degrees or less, 60 degrees or less, 55 degrees or less, 50 degrees or less, 45 degrees or less, 40 degrees or less, or 35 degrees or less. The second angle may be substantially about 30 degrees. In another example, the second angle may be greater than −90 degrees and less than 0 degrees. In another example, the second angle may be −5 degrees or less, −10 degrees or less, −15 degrees or less, −20 degrees or less, or −25 degrees or less, or may be −85 degrees or more, −80 degrees or more, −75 degrees or more, −70 degrees or more, −65 degrees or more, −60 degrees or more, −55 degrees or more, −50 degrees or more, −45 degrees or more, −40 degrees or more, or −35 degrees or more. The second angle may be substantially about −30 degrees.

On the other hand, the second holographic element may be an optical element capable of transmitting the incident light incident on the light entrance surface or the light exit surface at an incident angle of a third angle, and reflecting the incident light incident on the light entrance surface or the light exit surface at an incident angle of a fourth angle in a direction parallel to the direction of the incident light.

Here, the third angle and the fourth angle are different angles from each other.

In one example, the third and fourth angles may be each greater than 0 degrees and less than 90 degrees. In another example, the third and fourth angles may be each 5 degrees or more, 10 degrees or more, 15 degrees or more, 20 degrees or more, or 25 degrees or more, or may be 85 degrees or less, 80 degrees or less, 75 degrees or less, 70 degrees or less, 65 degrees or less, 60 degrees or less, 55 degrees or less, 50 degrees or less, 45 degrees or less, 40 degrees or less, or 35 degrees or less. The second angle may be substantially about 30 degrees. In another example, the third and fourth angles may be each greater than −90 degrees and less than 0 degrees. In another example, the third and fourth angles may be each −5 degrees or less, −10 degrees or less, −15 degrees or less, −20 degrees or less, or −25 degrees or less, or may be −85 degrees or more, −80 degrees or more, −75 degrees or more, −70 degrees or more, −65 degrees or more, −60 degrees or more, −55 degrees or more, −50 degrees or more, −45 degrees or more, −40 degrees or more, or −35 degrees or more. The third and fourth angles may be substantially −30 degrees.

In such a state, the first and second holographic elements may be disposed such that the absolute value of the difference between the second angle and the third angle is in a range of 0 degrees to 10 degrees. In another example, the absolute value of the difference may be 9 degrees or less, 8 degrees or less, 7 degrees or less, 6 degrees or less, 5 degrees or less, 4 degrees or less, 3 degrees or less, 2 degrees or less, or 1 degree or less. That is, the second and third angles may be substantially the same angle as each other.

In addition, they may be disposed such that the absolute value of the sum of the third angle and the fourth angle is in a range of 0 degrees to 10 degrees. In another example, the absolute value of the sum may be 9 degrees or less, 8 degrees or less, 7 degrees or less, 6 degrees or less, 5 degrees or less, 4 degrees or less, 3 degrees or less, 2 degrees or less, or 1 degree or less. That is, the third and fourth angles may be opposite in sign to each other and at the same time the values may be substantially the same angle.

The retarder may be present at a position where light transmitted through the second holographic element via the first holographic element can be incident. As the retarder, a λ/2 plate or a λ/4 plate may be applied. The term λ/2 plate is a retarder referred to as a so-called HWP (half wave plate), which is an element that when linearly polarized light is incident, the polarization direction of the linearly polarized light can be rotated by approximate 90 degrees, and the term λ/4 plate is a retarder referred to as a so-called QWP (quarter wave plate), which is an element capable of converting linearly polarized light and circularly polarized light to each other. Retarders that can act as the λ/2 plate or λ/4 plate are variously known in this field. For example, the retarder may be a polymer stretched film or a liquid crystal polymer film. As the polymer stretched film, for example, an acrylic film, a polyolefin film such as a polyethylene film or a polypropylene film, a cycloolefin polymer (COP) film such as a polynorbornene film, a polyvinyl chloride film, a polyacrylonitrile film, a polysulfone film, a polyvinyl alcohol film or a cellulose ester polymer film such as a TAC (triacetyl cellulose) film, or a copolymer film of two or more monomers among monomers forming the polymer, and the like may be exemplified. The retarder may be formed by appropriately stretching such a film by a method known in this field. In addition, as the liquid crystal polymer film, a film obtained by orienting and polymerizing a known liquid crystal film such as a nematic liquid crystal or a discotic liquid crystal may be exemplified.

Retarders that can act as the λ/2 plate or λ/4 plate in this field are known and such films may be used without limitation in the present application.

The reflective polariscope may be disposed at a position where light transmitted through the retarder can be incident. The reflective polariscope is a polarizer that any one polarized light among the orthogonal mode pair of polarized lights is transmitted and the other polarized light is reflected. Such a reflective polariscope includes a polarizing beam splitter, a wire grid polarizer (WGP) such as a metal wire grid polarizer, a dual brightness enhancement film (DBEF) or a cholesteric liquid crystal (CLC) film, which exhibits the above effects by applying a so-called anisotropic material polarization separator or a thin film coating type polarizer. For example, light having a desired wavelength range can be split to the orthogonal mode pair through control of the size or pitch of the grid in the metal wire grid polarizer, the laminated structure of the double brightness enhancement film, the pitch or the rotation direction of the liquid crystals in the cholesteric liquid crystal film, and the like. The type of the reflective polariscope applicable in the present application is not limited to the above, where all the reflective polariscopes known to be capable of splitting the incident light into the orthogonal mode pair of polarized lights can be applied.

Besides, here, the orthogonal mode pair may comprise two linearly polarized lights whose polarization directions are perpendicular to each other or two circularly polarized lights whose rotation directions are opposite to each other. As used herein, the term vertical, horizontal, parallel or orthogonal may mean substantially vertical, horizontal, parallel or orthogonal, taking into account an error, where the error, for example, within ±10 degrees, within ±8 degrees, within ±6 degrees, within ±4 degrees, within ±2 degrees, within ±1 degree, or within ±0.5 degrees may exist. In addition, the term circularly polarized light herein is a concept including also so-called elliptically polarized light. In the present application, for convenience of division, any one polarized light among the orthogonal mode pair of polarized lights may be referred to as a first polarized light and the other polarized light may be referred to as a second polarized light.

The reflective polariscope as above may be located such that light transmitted through the retarder is incident on the reflective polariscope at an incident angle which is a fifth angle. Therefore, any one polarized light of the orthogonal mode pair of the first and second polarized lights incident on the reflective polariscope is transmitted through the reflective polariscope, and the other polarized light is reflected to an angle which is different from the sign of the fifth angle and is the same as its value.

In this reflective polariscope, the absolute value of the difference between the fifth angle and the third angle may be in a range of 0 degrees to 10 degrees. In another example, the absolute value of the difference may be about 9 degrees or less, 8 degrees or less, 7 degrees or less, 6 degrees or less, 5 degrees or less, 4 degrees or less, 3 degrees or less, 2 degrees or less or 1 degree, or may be substantially 0 degrees. That is, the fifth angle and the third angle may be substantially the same angle.

The principle of the element having such a configuration will be described with reference to FIG. 2. FIG. 2 is a diagram schematically showing an optical isolation element according to one aspect of the present application. The polarization conversion element in the diagram comprises the first holographic element (100), the second holographic element (200), the retarder (300) and the reflective polariscope (400), where the traveling path of light in the diagram is indicated by arrows. In the diagram, it is assumed that λ/4 plate is used as the retarder (300) and the incident light (L) is composed of two linearly polarized lights having polarization directions orthogonal to each other and enters the light entrance surface of the first holographic element (100) vertically.

As in the diagram, the incident light (L) enters the first holographic element (100) at a first angle (about 0 degrees). The incident light (L) incident in this manner is refracted by the first holographic element and exited to a second angle (assuming about 30 degrees in the diagram). The exited light is represented by L2. The exited light (L2) is still an unpolarized state in this state. Therefore, the light (L2) is transmitted through the retarder (300) as such, and is incident on the reflective polariscope (400). The light (L2) incident on the reflective polariscope (400) is still the unpolarized state, and when this light (L2) is incident on the reflective polariscope (400), the first polarized light (P) among the light in the unpolarized state is transmitted through the reflective polariscope (400) and the second polarized light (S) is reflected. At this time, in the reflected angle the value is substantially the same as the incident angle to the reflective polariscope (400), that is, the fifth angle, but the sign is opposite.

However, since the fifth angle and the third angle are substantially the same angle, and the third angle and the fourth angle are the angles that the values are substantially the same but the signs are opposite, the second polarized light (S) reflected by the reflective polariscope (400) is incident on the light exit surface of the second holographic element (200) via the retarder (300) at the fourth angle. Therefore, the second polarized light (S) is again reflected by the second holographic element (200). However, since the second polarized light (S) passes through the retarder (300) twice in the above process, a phase delay value by the retarder (300) becomes substantially λ/2, and thus the light which is reflected by the second holographic element (200) and is incident on the reflective polariscope (400) via the retarder (300) becomes the first polarized light (P) state. Therefore, the first polarized light (P) can be transmitted through the reflective polariscope (400).

According to the principle as above, theoretically, the light incident on the optical isolation element in the forward direction (direction facing from the light entrance surface of the first holographic element to its light exit surface) is transmitted almost 100% in the first polarized light (P) state, but the light incident in the backward direction (direction facing from the light exit surface of the first holographic element to its light entrance surface) first meets the reflective polariscope (400), and thus at least 50% is reflected.

By such a principle, the optical isolation element having a transmittance in a forward direction larger than a transmittance in a backward direction can be realized.

The optical isolation element as above may also comprise additional configurations. For example, the optical isolation element may further comprise a prism or a reflective plate for controlling a light path of the light transmitted through the reflective polariscope along the direction facing from the light entrance surface of the first holographic element to the light exit surface. That is, as confirmed from FIG. 2, the light transmitted through the reflective polariscope (400) may be the first polarized light (P) which is the same kind of polarized light to each other, but have different traveling directions. Therefore, the prism or the reflective plate may be disposed at an appropriate position to match the traveling directions.

The optical isolation device may further comprise a phase delay plate at a position where light transmitted through the reflective polariscope can enter along the direction facing from the light entrance surface of the first holographic element to the light exit surface.

Here, the phase delay plate is an optical element having the same concept as the above-described retarder, but in the present application, it is referred to as a phase delay plate in order to distinguish it from the above-mentioned retarder. The phase delay plate may be located at a position where light traveling in a forward direction enters after being transmitted through the reflective polariscope. Such a phase delay plate can solve a problem that may occur as the light once transmitted through the optical isolation element in the forward direction travels toward the optical isolation element again by reflection or the like. That is, the light reflected due to the presence of the phase delay plate will be converted into linearly polarized light parallel to the reflection axis of the reflective polariscope, thereby being reflected back by the reflective polariscope.

In this case, the above-described λ/4 plate may be used as the phase delay plate. The specific types of the λ/4 plate are as described above.

In this case, the phase delay plate may be disposed such that its optical axis (e.g., slow axis) forms an angle in a range of about 40 degrees to 50 degrees, for example, about 45 degrees, or in a range of 130 degrees to 140 degrees, for example, about 135 degrees, with the transmission axis of the absorbing reflective polariscope.

The optical isolation element may further comprise, if necessary, a light-path controller, such as a prism or a reflective plate, which can additionally control the light path, in addition to those included in the above-described polarization conversion element.

In addition, the optical isolation element may comprise, if necessary, additional optical components other than the above. For example, the optical isolation element may comprise an optical component, such as the following louver plate.

Such a louver plate or the like may exist, for example, behind the side where the light traveling in the forward direction is finally exited, for example, the reflective polariscope or the phase delay plate as described above.

The optical isolation device may comprise one or two or more optical isolation elements as above. When two or more optical isolation elements are included, each of the optical isolation elements may be disposed so that the light transmitted through any one optical isolation element along the forward direction may enter the side of the polarization conversion element of the other optical isolation element. By applying a plurality of optical isolation elements as above, the optical isolation ratio can be more improved. For example, referring to FIG. 3, theoretically, light transmitted through a number of optical isolation elements in the forward direction continues to be transmitted without loss, but in the case of light transmitted in the backward direction, it continues to be reduced by an exponent of ½. Therefore, by controlling the number of the optical isolation elements, it is possible to maximize the optical isolation ratio.

Advantageous Effects

The present application provides an optical isolation device having a high transmittance in a forward direction an excellent optical isolation ratio. Such an optical isolation device can be applied to various applications such as the field of optical communication or laser optics, the field of security or privacy protection, brightness enhancement of displays, or a use for hiding and covering.

BRIEF DESCRIPTION OF DRAWINGS

FIG. 1 is a diagram schematically showing a Faraday optical isolator.

FIG. 2 is a schematic diagram of an optical isolation element of the present application.

FIG. 3 is a diagram schematically showing a case where a number of optical isolation elements are included.

MODE FOR INVENTION

Hereinafter, the present application will be described in detail with reference to the following examples and comparative examples, but the scope of the present application is not limited to the following examples.

Example 1

After manufacturing an element having the structure as shown in FIG. 2, a Genesis MX SLM laser from Coherent was entered into the relevant element (power 10 mW) to test the element. As the holographic optical elements (100 and 200 in FIG. 2) used in manufacturing the element, elements manufactured in a known manner were used. That is, the holographic optical element was manufactured with a laser power of about 200 mW in an interferometer using the Genesis MX SLM laser from Coherent with a wavelength of 532 nm as a light source to a photopolymer having a thickness of about 5 m to 30 μm. The photopolymer had a refractive index before exposure of about 1.5 and a refractive index difference in interference patterns of about 0.03 after exposure.

In the element of FIG. 2, as the retarder (300), a λ/4 plate exhibiting a phase delay characteristic of λ/4 for the incident light was used, and as the reflective polariscope (400), a WGP (wire grid polarizer) was used.

The ratio (T1/T2) of the forward transmittance (T1) obtained by irradiating the element having the above shape with light (L) as shown in FIG. 2 (forward irradiation) and the backward transmittance (T2) determined by transmitting light in the opposite direction was about 2.6, and the ratio of the first polarized light among the lights transmitted in the forward direction was about 94.1%.

Also, the isolation ratio (IR) determined for the element was about 4.1 dB.

The invention claimed is:

1. An optical isolation device comprising at least one optical isolation element,
wherein the optical isolation element comprises a first holographic element, a second holographic element, a retarder and a reflective polariscope in this order, each of which comprises a light entrance surface and a light exit surface,
the first holographic element is an optical element capable of exiting the incident light incident on the light entrance surface at an incident angle of a first angle in a range of greater than −90 degrees and less than 90 degrees to an output angle of a second angle different from the first angle,
the second holographic element is an optical element capable of transmitting the incident light incident on the light entrance surface or the light exit surface at an incident angle of a third angle, and reflecting the incident light incident on the light entrance surface or the light exit surface at an incident angle of a fourth angle different from the third angle in a direction parallel to the direction of the relevant incident light,
the second to fourth angles are each in a range of greater than 0 degrees and less than 90 degrees, or in a range of greater than −90 degrees and less than 0 degrees,
the absolute value of the difference between the second angle and the third angle is in a range of 0 degrees to 10 degrees, and
the absolute value of the sum of the third angle and the fourth angle is in a range of 0 degrees to 10 degrees.

2. The optical isolation device according to claim 1, wherein the optical isolation device has an isolation ratio (IR) of 3 dB or more, as defined by Equation 1 below:

IR=10×n×log(F/B)  [Equation 1]

wherein, IR is an isolation ratio, n is a number of optical isolation elements included in the optical isolation device, F is a transmittance of the light incident on the optical isolation device in a direction facing from the light entrance surface of the first holographic element to the light exit surface and B is a transmittance of the light incident on the optical isolation device in a direction facing from the light exit surface of the first holographic element to the light entrance surface.

3. The optical isolation device according to claim 1, wherein the retarder is a λ/4 plate.

4. The optical isolation device according to claim 1, wherein the reflective polariscope is a wire grid polarizer, a dual brightness enhancement film or a cholesteric liquid crystal film.

5. The optical isolation device according to claim 1, wherein the reflective polariscope is located such that light transmitted through the retarder is incident on the reflective polariscope at an incident angle which is a fifth angle, and the absolute value of the difference between the fifth angle and the third angle is in a range of 0 degrees to 10 degrees.

6. The optical isolation device according to claim 1, further comprising a prism or a reflective plate for controlling a light path of the light transmitted through the reflective polariscope along the direction facing from the light entrance surface of the first holographic element to the light exit surface.

7. The optical isolation device according to claim 1, further comprising a phase delay plate at a position where light transmitted through the reflective polariscope can enter along the direction facing from the light entrance surface of the first holographic element to the light exit surface.

8. The optical isolation device according to claim 7, wherein the phase delay plate is disposed such that its slow axis forms any one angle in a range of about 40 degrees to 50 degrees or any one angle in a range of 130 degrees to 140 degrees with the transmission axis of the reflective polariscope.

9. The optical isolation device according to claim 7, wherein the phase delay plate comprises a λ/2 plate and a λ/4 plate.

* * * * *